US011960191B2

(12) United States Patent
Yang et al.

(10) Patent No.: US 11,960,191 B2
(45) Date of Patent: Apr. 16, 2024

(54) CONDUCTIVE STRUCTURE AND E-PAPER DEVICE

(71) Applicant: SES-IMAGOTAG SA, Nanterre (FR)

(72) Inventors: Chin-An Yang, Tainan (TW); Yew-Chun Wang, Tainan (TW)

(73) Assignee: SES-IMAGOTAG SA, Nanterre (FR)

(*) Notice: Subject to any disclaimer, the term of this patent is extended or adjusted under 35 U.S.C. 154(b) by 530 days.

(21) Appl. No.: 17/371,671

(22) Filed: Jul. 9, 2021

(65) Prior Publication Data
US 2022/0026776 A1 Jan. 27, 2022

(30) Foreign Application Priority Data
Jul. 27, 2020 (TW) ................. 109209562

(51) Int. Cl.
*G02F 1/167* (2019.01)
*G02F 1/16755* (2019.01)
*G02F 1/16757* (2019.01)
*G02F 1/1676* (2019.01)
*G02F 1/1679* (2019.01)
*G02F 1/1675* (2019.01)

(52) U.S. Cl.
CPC .......... *G02F 1/167* (2013.01); *G02F 1/16755* (2019.01); *G02F 1/16757* (2019.01); *G02F 1/1676* (2019.01); *G02F 1/1679* (2019.01); *G02F 2001/1678* (2013.01)

(58) Field of Classification Search
CPC .. G02F 1/167; G02F 1/16755; G02F 1/16757; G02F 1/1676; G02F 1/1679; G02F 2001/1678

USPC ......................................... 359/296
See application file for complete search history.

(56) References Cited

U.S. PATENT DOCUMENTS

| | | | | |
|---|---|---|---|---|
| 2005/0286116 | A1* | 12/2005 | Kanbe | G02F 1/167 359/296 |
| 2011/0176199 | A1* | 7/2011 | Sakurai | G02F 1/167 359/296 |
| 2012/0002268 | A1* | 1/2012 | Uchida | G02F 1/16757 359/296 |
| 2014/0300837 | A1* | 10/2014 | Gates | G06F 3/0443 349/12 |
| 2018/0088435 | A1* | 3/2018 | Liang | G02F 1/172 |
| 2018/0157142 | A1* | 6/2018 | Miyata | G09G 3/344 |

* cited by examiner

*Primary Examiner* — William R Alexander
(74) *Attorney, Agent, or Firm* — Muncy, Geissler, Olds & Lowe, P.C.

(57) ABSTRACT

A conductive structure is applied to an e-paper device, which includes a driving substrate and an e-paper film. The e-paper film is disposed on the driving substrate, and includes a transparent substrate, a common electrode layer, and a display medium layer disposed between the common electrode layer and the driving substrate. The common electrode layer is disposed on one side of the transparent substrate facing the driving substrate. The display medium layer includes a through hole. The conductive structure is disposed in the through hole and includes a conductive member and at least one spacer. The conductive member is electrically connected to the driving substrate and the common electrode layer. The spacer is disposed in/on the conductive member, and contacts with the driving substrate and the common electrode layer. An e-paper device with the conductive structure is also disclosed.

12 Claims, 3 Drawing Sheets

CONDUCTIVE STRUCTURE AND E-PAPER DEVICE

CROSS REFERENCE TO RELATED APPLICATIONS

This Non-provisional application claims priority under 35 U.S.C. § 119(a) on Patent Application No(s). 109209562 filed in Taiwan, Republic of China on Jul. 27, 2020, the entire contents of which are hereby incorporated by reference.

BACKGROUND

Technology Field

The present disclosure relates to a conductive structure and an e-paper device with the conductive structure, which can solve the abnormal display problem.

Description of Related Art

With the advancements of science and technology, display devices as the human-machine interface are also continuously improving, and are developed in a diversified direction to meet human needs. Among them, the liquid crystal display (LCD) devices have replaced the conventional cathode ray tube (CRT) display devices and have been widely used in various electronic products (e.g. TVs, laptop computers, desktop screens, etc.) due to their advantages of low power consumption, low heat generation, light weight, and non-radiation.

However, both the CRT display device and the LCD device still have the disadvantage of requiring continuous power supply. In other words, the display device needs to continuously consume electric power while displaying images. Therefore, a bi-stable e-paper display device was invented to solve this disadvantage. When the bi-stable e-paper device displays an image or a frame, the additional power supply is not required, and the image or frame can be continuously remained. The additional power supply is required only when changing to another state or another frame. Due to the characteristics of low power consumption and memorability, the e-paper device has become one of the optimum choices for the next generation of display devices.

In general, the e-paper device includes an e-paper film and a driving substrate, which can drive the e-paper film to display images. In the manufacturing process of the e-paper device, it is necessary to provide the conductive paste on the driving substrate (dispensing), and then to align the holes of the e-paper film with the conductive paste, so as to attach the e-paper film on the driving substrate correspondingly. Accordingly, the driving substrate can transmit a common voltage to the common electrode layer of the e-paper film through the conductive paste in the holes, so that the e-paper film can generate a crossing voltage to drive the display medium.

After disposing the e-paper film on the driving substrate, a lamination process is needed to tightly attach the e-paper film to the driving substrate. However, during the lamination process, when the roller rolls above the hole, the layer(s) (e.g. the common electrode layer) of the e-paper film over the hole may be depressed into the hole, and the conductive paste inside the hole will be pushed and move outwardly. After the roller leaves the position above the hole, the conductive paste inside the hole will be pulled toward the common electrode layer due to the adhesion force between the layer and the conductive paste while the layer bounces back, thereby causing the deformation of the conductive paste. In practice, the conductive paste may be deformed into a dumbbell shape (narrower at the middle and wider at the top and bottom). This deformation can result the increased impedance of the conductive paste, which will cause the voltage drop of the common voltage (i.e. the common voltage is not accurate), thereby leading to the abnormal display.

SUMMARY

In view of the foregoing, an objective of this disclosure is to provide a conductive structure and an e-paper device with the conductive structure, which can solve the abnormal display problem caused by the voltage drop of the common voltage.

To achieve the above, the present disclosure provides a conductive structure, which is applied to an e-paper device. The e-paper device comprises a driving substrate and an e-paper film. The e-paper film is disposed on the driving substrate and comprises a transparent substrate, a common electrode layer and a display medium layer. The transparent substrate is disposed opposite to the driving substrate, and the common electrode layer is disposed on one side of the transparent substrate facing the driving substrate. The display medium layer is disposed between the common electrode layer and the driving substrate and comprises a through hole. The conductive structure is disposed in the through hole, and comprises a conductive member and at least one spacer. The conductive member is electrically connected to the driving substrate and the common electrode layer. The spacer is disposed in/on the conductive member, and the spacer contacts with the driving substrate and the common electrode layer.

To achieve the above, the present disclosure also provides an e-paper device, which comprises a driving substrate, an e-paper film and a conductive structure. The e-paper film is disposed on the driving substrate and comprises a transparent substrate, a common electrode layer and a display medium layer. The transparent substrate is disposed opposite to the driving substrate. The common electrode layer is disposed on one side of the transparent substrate facing the driving substrate. The display medium layer is disposed between the common electrode layer and the driving substrate, and comprises a through hole. The conductive structure is disposed in the through hole and comprises a conductive member and at least a spacer. The conductive member is electrically connected to the driving substrate and the common electrode layer. The spacer is disposed in/on the conductive member, and the spacer contacts with the driving substrate and the common electrode layer.

As mentioned above, in the conductive structure and e-paper device of this disclosure, the conductive structure is disposed inside the through holes of the display medium layer of the e-paper film, the driving substrate is electrically connected to the common electrode layer through the conductive member of the conductive structure, and the spacer of the conductive structure contacts (against) the driving substrate and the common electrode layer. Accordingly, during the lamination process, the spacer can provide the supporting function, so that the layer(s) above the through hole is not depressed, thereby preventing the deformation of the conductive member and the increase of the impedance.

As a result, the abnormal display problem caused by the voltage drop of the common voltage can be solved.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1A:
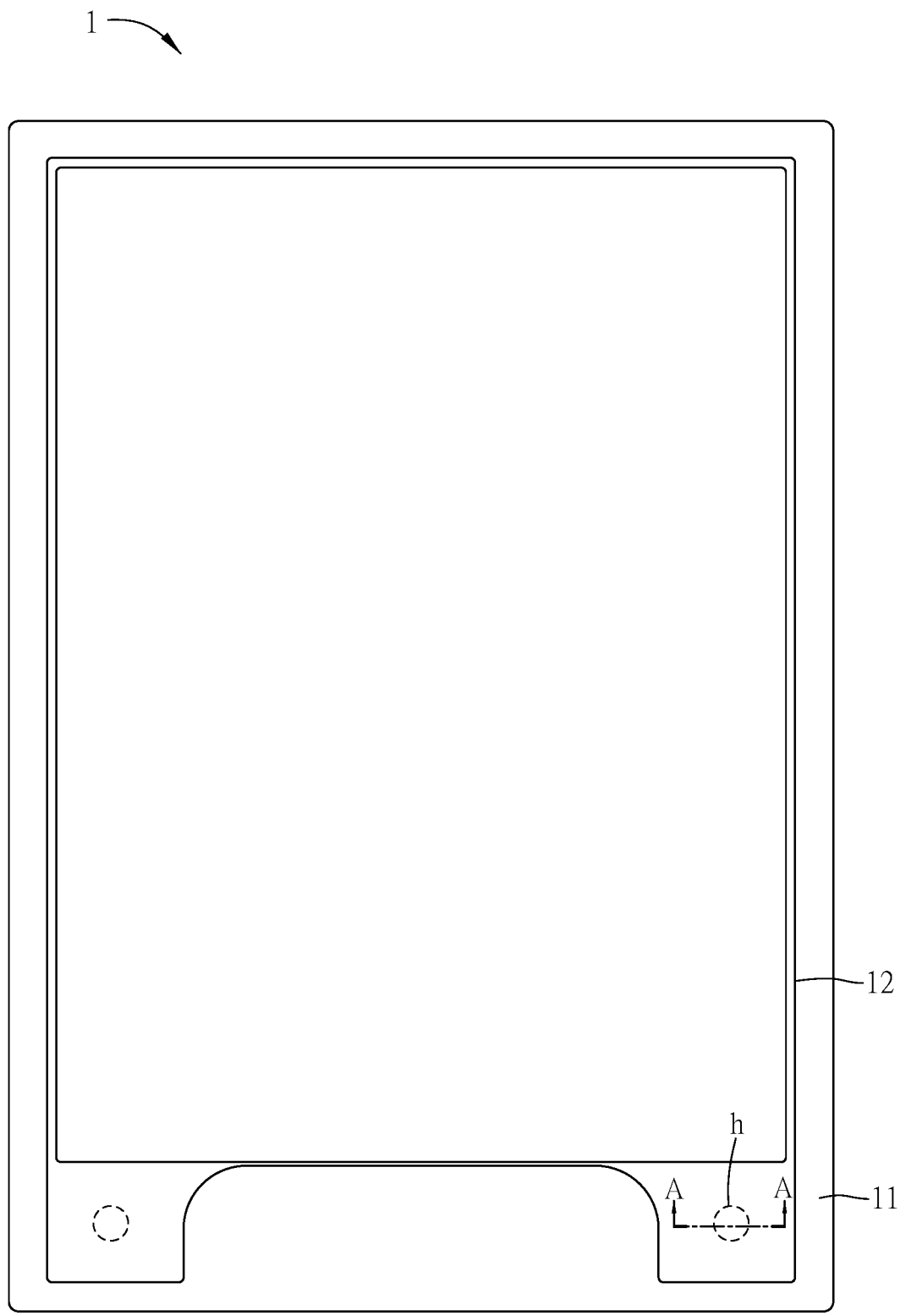
FIG. 1A is a schematic diagram showing an e-paper device according to an embodiment of this disclosure.
Figure 1B:
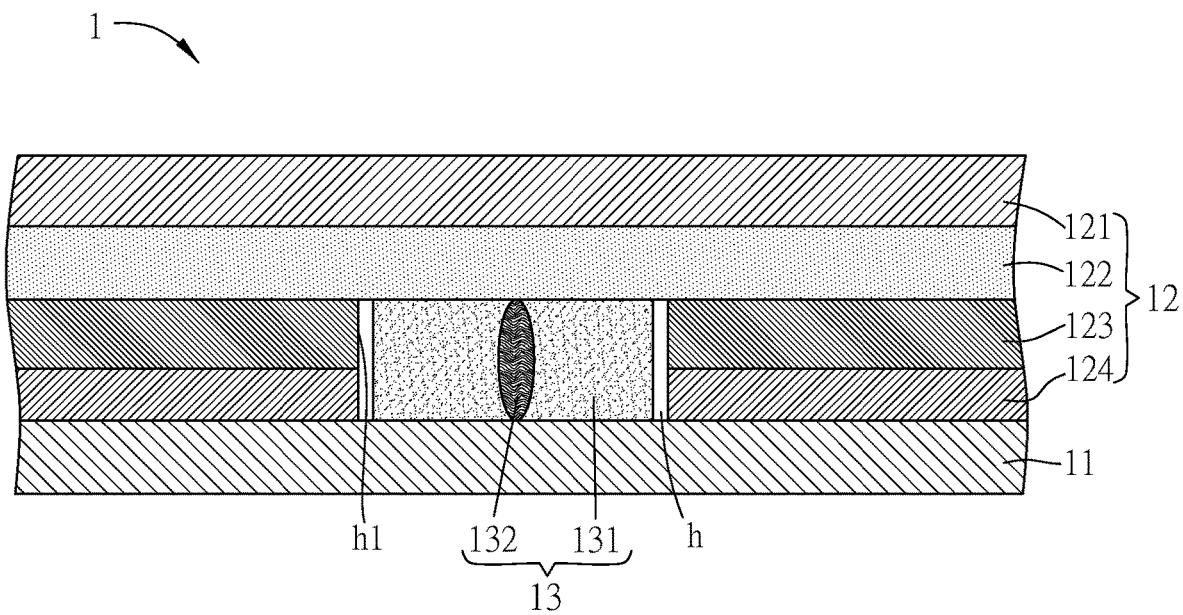
FIG. 1B is a sectional view of the e-paper device of FIG. 1A along the line A-A.

FIG. 1A is a schematic diagram showing an e-paper device according to an embodiment of this disclosure, and FIG. 1B is a sectional view of the e-paper device of FIG. 1A along the line A-A.

Referring to FIGS. 1A and 1B, the e-paper device 1 comprises a driving substrate 11 and an e-paper film 12. The driving substrate 11 is electrically connected to the e-paper film 12 for driving the e-paper film 12 to display images.

The driving substrate 11 comprises a plurality of pixels, a plurality of scan lines, and a plurality of data lines. The pixels, scan lines and data lines are configured on a substrate. In practice, the pixels are arranged in an array with rows and columns, and the data lines and scan lines are interlaced to define the positions of the pixels. Each pixel comprises at least one switch (e.g. a TFT), so that the driving substrate 11 is functioned as an AM (Active Matrix) TFT substrate for controlling to form the electric field of each pixel or not. The substrate of the driving substrate 11 can be modified based on the product requirement, and it can be a glass substrate, a plastic substrate or a flexible substrate. The material of the flexible substrate can be, for example but not limited to, PI (Polyimide).

The e-paper film 12 is a bi-stable display device, which has the advantages of power saving and wide viewing angle. The e-paper film can be a microcapsule e-paper, a microcup e-paper, or Cholesteric liquid crystal (Ch-LC) e-paper, and this disclosure is not limited thereto. When the e-paper film 12 is a microcapsule or microcup e-paper, the display medium thereof may be an electrophoretic substance. Alternatively, when the e-paper film 12 is a cholesterol liquid crystal e-paper, the display medium thereof may be cholesterol liquid crystal molecules. When the e-paper film 12 is another type of bi-stable display device, the display medium can be another type of bi-stable substance, and this disclosure is not limited.

In this embodiment, the e-paper film 12 comprises a transparent substrate 121, a common electrode layer 122, and a display medium layer 123. The transparent substrate 121 is disposed opposite to the driving substrate 11. In practice, the transparent substrate 12 can be a plastic substrate, which is made of, for example but not limited to, PET. The common electrode layer 122 is disposed on one side of the transparent substrate 121 facing the driving substrate 11. The display medium layer 123 is disposed between the common electrode layer 122 and the driving substrate 11. Herein, the common electrode layer 122 is entirely formed on the surface of the transparent substrate 121 facing the display medium layer 123 in a whole. Accordingly, the common electrode layer 122 and the pixel electrode of each pixel in the driving substrate 11 can together form an electric field for controlling the display medium corresponding to the pixel to act, thereby allowing the e-paper film 12 to form images.

In some embodiments, when the e-paper film 12 is a microcapsule or microcup e-paper, the display medium layer 123 comprises electrophoretic substances, which include a plurality of charged light-colored pigment particles and a dark medium solution. The pigment particles and the medium solution are respectively contained in a plurality of microcapsules, and the microcapsules can be combined by an adhesive. Alternatively, the content of the electrophoretic substance can also be a combination of dark pigment particles and a light-colored medium solution. Alternatively, the content of the electrophoretic substance can also be a combination of pigment particles with multiple colors and a light-colored medium solution. This disclosure is not limited thereto.

When the scan driver turns on the scan lines in order, the data driver can transmit the data voltage signals corresponding to pixels in each row to the pixel electrodes of the pixels through the data line. Accordingly, the electric field can be formed between the pixel electrode of the pixel and the common electrode layer 122 of the e-paper film 12, so that the charged pigment particles in the electrophoretic substance can be moved in the medium solution. When the external light penetrates through the transparent substrate 121 and enters the e-paper film 12, the charged pigment particles can reflected the incident light, so that the viewer's eyes can receive the light reflected by the charged pigment particles in the background of the medium solution, thereby viewing the displayed image or frame.

In order to enable the driving substrate 1 to transmit the common voltage to the common electrode layer 122, the display medium layer 123 of this embodiment comprises at least one through hole h, and the conductive structure 13 is correspondingly disposed in the through hole h. As shown in FIG. 1A, the display medium layer 123 of the e-paper device 1 comprises, for example but not limited to, two through holes h. Of course, the amount of the through holes h is not limited. When the display medium layer 123 comprises multiple through holes h, each through hole h can be correspondingly configured with one conductive structure 13, or only some of the through holes h are configured with the conductive structures 13.

Referring to FIG. 1B, the conductive structure 13 is disposed in the through hole h, so that the driving substrate 11 can be electrically connected with the common electrode layer 122 through the conductive structure 13. Accordingly, the driving substrate 11 can transmit the common voltage to the common electrode layer 122 through the conductive structure 13. In this embodiment, the through hole h has a side wall hl, and the conductive structure 13 does not contact with the side wall hl. Specifically, in the process of disposing the conductive structure 13 in the through hole h, the conductive structure 13 does not fully fill the entire through hole h, so that the conductive structure 13 does not contact with the side wall hl. The reason of this configuration is that if the conductive structure 13 fully fills the entire through hole h and contacts with the side wall hl, the external moisture may easily penetrates into the through hole h (as well as the e-paper film 12) through the conductive structure 13, thereby affecting the normal operation of the e-paper film 12.

The conductive structure 13 comprises a conductive member 131 and at least one spacer 132. As shown in FIG. 1B, the conductive structure 13 comprises one spacer 132 for example. The conductive member 131 is electrically connected to the driving substrate 11 and the common electrode layer 122 individually, so that the driving substrate 11 can transmit the common voltage to the common electrode layer 122 through the conductive structure 13 (the conductive member 131). In addition, the spacer 132 is disposed in/on the conductive member 131, so that the conductive member 131 can cover at least a part of the surface of the spacer 132. In this embodiment, the conductive member 131 entirely covers the spacer 132, so that the spacer 132 is located inside the conductive member 131 and contacts (against) the driving substrate 11 and the common electrode layer 122. In some embodiments, the conductive member 131 may cover only a part of the spacer 132, so that a part of the spacer 132 protrudes beyond the conductive member 131. In addition, when viewing from one side of the transparent substrate 121 away from the driving substrate 11, the shape of the spacer 132 can be circular, elliptic, polygonal (quadrilateral, pentagonal, etc.), irregular, or a combination thereof. This disclosure is not limited, only if the spacer 132 can contact against the driving substrate 11 and the common electrode layer 122.

The material of the conductive member 131 can comprise, for example, the Ag paste, Sn paste, ACF, or the combination thereof. The material of the spacer 132 can comprise the metal material or non-metal material, and the non-metal material comprises, for example but not limited to, the photosensitive photoresist materials such as resin, silicate, or glass fiber. This disclosure is not limited. In some embodiments, the material of the spacer 132 can be the same as the material for manufacturing the spacers disposed between the TFT substrate and the CF substrate of an LCD panel.

In some embodiments, multiple spacers 132 are mixed unsolidified conductive member 131 (e.g. silver conductive paste), and then the unsolidified conductive member 131 containing the spacers 132 is filled in the through holes h (dispensing process). Alternatively, the spacers 132 are disposed in the through holes h, and then the unsolidified conductive member 131 is filled in the through holes h. Alternatively, the unsolidified conductive member 131 is filled in the through holes h, and then the spacers 132 are disposed in/on the unsolidified conductive member 131. Afterwards, the solidification process is performed to obtain the conductive structure 13 containing the spacer(s) 132 and the conductive member 131.

In addition, the e-paper film 12 can further comprise an adhesion layer 124, which is disposed between the display medium layer 123 and the driving substrate 11. The adhesion layer 124 comprises a through hole corresponding to the through hole h. The adhesion layer 124 is configured to attach the e-paper film 12 to the upper surface of the driving substrate 11. The adhesion layer 124 can be an electronic ink adhesive layer, and the material thereof can be, for example but not limited to, a thermal curing adhesive.

As mentioned above, in the e-paper device 1 of this embodiment, the conductive structure 13 is disposed inside the through holes h of the display medium layer 123 of the e-paper film 12, the driving substrate 11 is electrically connected to the common electrode layer 122 through the conductive member 131 of the conductive structure 13, and the spacer 132 of the conductive structure 13 contacts (against) the driving substrate 11 and the common electrode layer 122. Accordingly, during the lamination process, when the roller rolls above the through hole h, the spacer 132 can provide the supporting function, so that the transparent substrate 121 and the common electrode layer 122 above the through hole h are not depressed, thereby preventing the deformation of the conductive member 131 and the increase of the impedance. Therefore, when the driving substrate 11 transmits the common voltage to the common electrode layer 122 through the conductive member 131, the undesired voltage drop can be avoided, thereby solving the abnormal display problem caused by the voltage drop of the common voltage.

Figure 2:
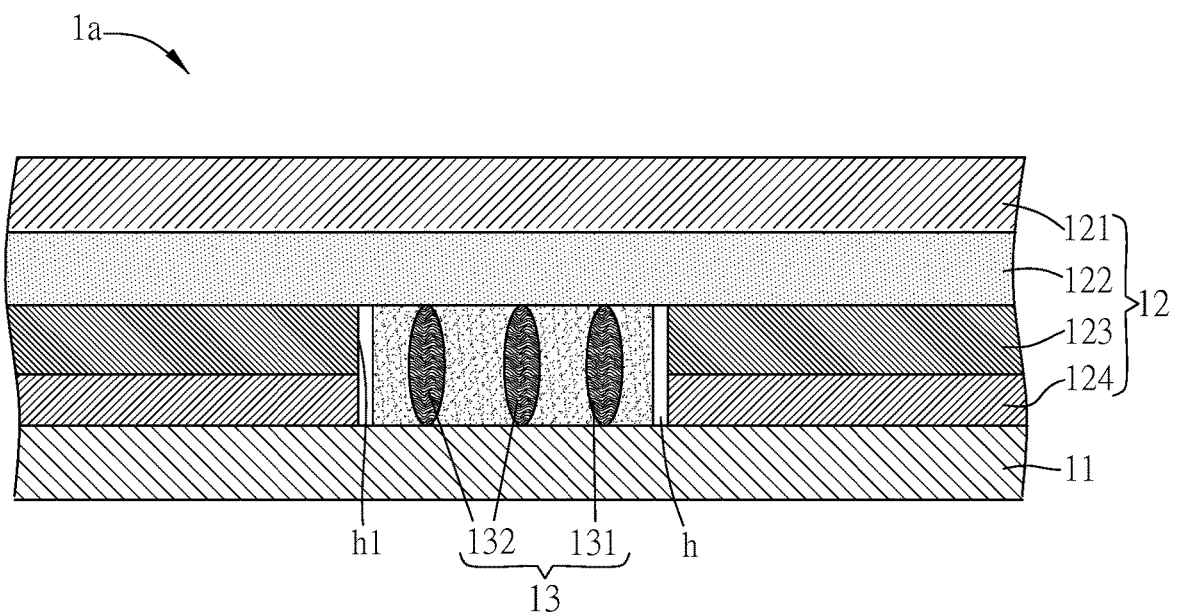
FIGS. 2 to 4 are schematic diagrams showing the e-paper devices according to different embodiments of this disclosure.
Figure 3:
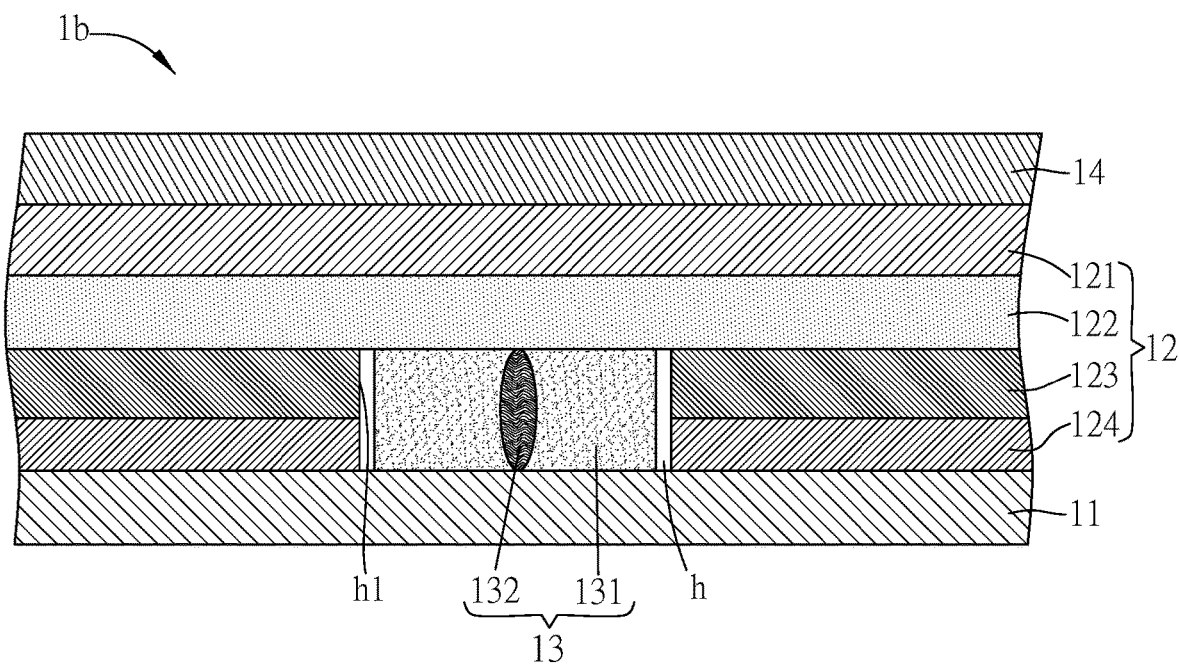
Figure 4:
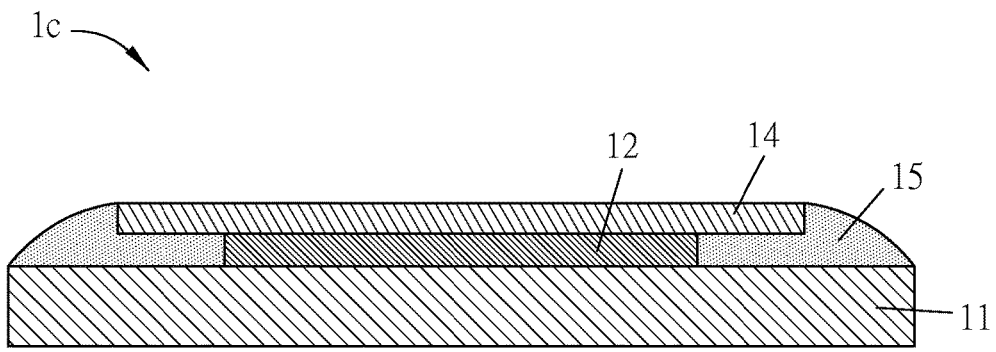

FIGS. 2 to 4 are schematic diagrams showing the e-paper devices according to different embodiments of this disclosure.

As shown in FIG. 2, the component configuration and connection of the e-paper device 1a of this embodiment are mostly the same as those of the e-paper device 1 of the previous embodiment. Different from the previous embodiment, the conductive structure 13 of the e-paper device 1a of this embodiment comprises a plurality of spacers 132 (e.g., for example but not limited to, three spacers 132).

As shown in FIG. 3, the component configuration and connection of the e-paper device 1b of this embodiment are mostly the same as those of the e-paper device 1 (or 1a) of the above-mentioned embodiment. Different from the above-mentioned embodiment, the e-paper device 1b of this embodiment further comprises a protection film 14, which is disposed on the surface of the e-paper film 12 away from the driving substrate 11. In this embodiment, the protection film 14 is attached to the upper surface of the transparent substrate 121 of the e-paper film 12 for protecting the e-paper device 1b from the damage of external objects or moisture. In some embodiments, the protection film 14 can further increase the optical properties (e.g. contrast) of the e-paper device 1b.

To be noted, FIG. 4 does not show the conductive structure 13 inside the e-paper film 12. As shown in FIG. 4, the component configuration and connection of the e-paper device 1c of this embodiment are mostly the same as those of the e-paper device 1b of the previous embodiment. Different from the previous embodiment, the e-paper device 1c of this embodiment further comprises a sealing member 15, which is disposed on the driving substrate 11, and the sealing member 15 is located at peripheries of the e-paper film 12 and the protection film 14. In this embodiment, the sealing member 15 can be disposed in the gap between the protection film 14 and the driving substrate 11. The sealing member 15 can be, for example, a sealant, which can prevent the invasion of external moisture through the sides of the e-paper film 12. The width of the sealing member 15 (sealant) can be modified to control the moisture isolation level of the e-paper film 12. The larger lateral width of the sealing member 15 can provide a better moisture isolation effect.

In summary, in the conductive structure and e-paper device of this disclosure, the conductive structure is disposed inside the through holes of the display medium layer of the e-paper film, the driving substrate is electrically connected to the common electrode layer through the conductive member of the conductive structure, and the spacer of the conductive structure contacts (against) the driving substrate and the common electrode layer. Accordingly, during the lamination process, the spacer can provide the supporting function, so that the layer(s) above the through hole is not depressed, thereby preventing the deformation of the conductive member and the increase of the impedance. As a result, the abnormal display problem caused by the voltage drop of the common voltage can be solved.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A conductive structure applied to an e-paper device, wherein the e-paper device comprises a driving substrate and an e-paper film, the e-paper film is disposed on the driving substrate and comprises a transparent substrate, a common electrode layer and a display medium layer, the transparent substrate is disposed opposite to the driving substrate, the common electrode layer is disposed on one side of the transparent substrate facing the driving substrate, the display medium layer is disposed between the common electrode layer and the driving substrate and comprises a through hole, and the conductive structure is disposed in the through hole and comprises:
    a conductive member electrically connected to the driving substrate and the common electrode layer; and
    at least a spacer disposed in/on the conductive member, wherein the spacer contacts with the driving substrate and the common electrode layer.

2. The conductive structure of claim 1, wherein the conductive member covers at least a part of a surface of the spacer.

3. The conductive structure of claim 1, wherein the through hole comprises a side wall, and the conductive structure does not contact with the side wall.

4. An e-paper device, comprising:
    a driving substrate;
    an e-paper film disposed on the driving substrate and comprising a transparent substrate, a common electrode layer and a display medium layer, wherein the transparent substrate is disposed opposite to the driving substrate, the common electrode layer is disposed on one side of the transparent substrate facing the driving substrate, the display medium layer is disposed between the common electrode layer and the driving substrate and comprises a through hole; and
    a conductive structure disposed in the through hole and comprises a conductive member and at least a spacer, wherein the conductive member is electrically connected to the driving substrate and the common electrode layer, the spacer is disposed in/on the conductive member, and the spacer contacts with the driving substrate and the common electrode layer.

5. The e-paper device of claim 4, wherein the driving substrate is an AM TFT substrate.

6. The e-paper device of claim 4, wherein the e-paper film is a microcapsule e-paper, a microcup e-paper, or a cholesteric liquid crystal (Ch-LC) e-paper.

7. The e-paper device of claim 4, wherein the conductive member covers at least a part of a surface of the spacer.

8. The e-paper device of claim 4, wherein the through hole comprises a side wall, and the conductive structure does not contact with the side wall.

9. The e-paper device of claim 4, wherein a shape of the spacer is circular, elliptic, polygonal, or irregular, or a combination thereof.

10. The e-paper device of claim 4, wherein the e-paper film further comprises an adhesion layer, and the adhesion layer is disposed between the display medium layer and the driving substrate.

11. The e-paper device of claim 4, further comprising:
    a protection film disposed on a surface of the e-paper film away from the driving substrate.

12. The e-paper device of claim 11, further comprising:
    a sealing member disposed on the driving substrate, wherein the sealing member is located at peripheries of the e-paper film and the protection film.

* * * * *